US006373953B1

(12) United States Patent
Flaks

(10) Patent No.: US 6,373,953 B1
(45) Date of Patent: Apr. 16, 2002

(54) APPARATUS AND METHOD FOR DE-ESSER USING ADAPTIVE FILTERING ALGORITHMS

(75) Inventor: Jason S. Flaks, Mountain View, CA (US)

(73) Assignee: Gibson Guitar Corp., Nashville, TN (US)

( * ) Notice: Subject to any disclaimer, the term of this patent is extended or adjusted under 35 U.S.C. 154(b) by 0 days.

(21) Appl. No.: 09/430,433

(22) Filed: Oct. 29, 1999

Related U.S. Application Data

(60) Provisional application No. 60/156,224, filed on Sep. 27, 1999.

(51) Int. Cl.[7] .................... H04B 15/00

(52) U.S. Cl. .................... 381/94.7; 381/21.9; 381/57

(58) Field of Search .................... 381/94.1, 94.2, 381/94.3, 94.7, 94.8, 94.9, FOR 124, 71.1, 71.8, 71.9, 71.11, 71.12, 71.13, 71.14, FOR 123, 56, 57, 92, 106

(56) References Cited

U.S. PATENT DOCUMENTS

| | | | |
|---|---|---|---|
| 5,574,791 | A | 11/1996 | Orban |
| 5,590,206 | A | 12/1996 | An et al. |
| 5,805,714 | A | 9/1998 | Kasama et al. |
| 5,838,806 | A | 11/1998 | Sigwanz et al. |

OTHER PUBLICATIONS

Analysis, Recognition, and Perception of Voiceless Fricative Consonants in Japanese dated (1978).

Adaptive & Digital Signal Processing with Digital Filtering Applications by Prof. Claude S. Lindquist, University of Miami, (undated).

A nonlinear Dynamical Systems Analysis of Fricative Consonants by Shrikanth S. Narayanan and Abeer A. Alwan, UCLA (1994).

1. Lemanski, Jr., "A New Vocal De–esser," Presented at the $69^{th}$ Convention of the Audio Engineering Society, May 1981, preprint 1775.

2. Lourens, J. "On the Sibilance Problem in FM Sound Transmission" IEEE Transactions on Broadcasting, 37, 3, p. 115–120, 1991.

3. Olivera, J., "A Feedfoward Side–Chain Limiter/Compressor/De–esser with Improved Flexibility," J. Audio Eng. Soc., 37, 4, p. 226–239, 1989.

4. Wolters, M., Sapp, M., and Becker, J., "Adaptive Algorithm for Detecting and Reducing Sibilants in Recorded Speech," Presented at the $104^{th}$ Convention of the Audio Engineering Society, May 1998, preprint 4677.

A New Vocal De–esser by Joseph B. Lemanski dbx, Incorporated, Newton, MA.

*Primary Examiner*—Xu Mei
(74) *Attorney, Agent, or Firm*—Waddey & Patterson; Lucian Wayne Beavers

(57) ABSTRACT

A method and apparatus for the real-time creation of an output audio signal from an input signal with an unwanted or noise portion. The system detects the unwanted portion of the input signal by utilizing an adaptive detection filter and reduces the unwanted portion of the input signal. The reduction of the unwanted portion is performed by compression of the unwanted signal, subtraction of the unwanted portion of the signal, or eliminating the output signal until the unwanted portion is no longer detected. The system is specifically designed to find a high frequency and high amplitude sound such as a sibilant.

24 Claims, 7 Drawing Sheets

APPARATUS AND METHOD FOR DE-ESSER USING ADAPTIVE FILTERING ALGORITHMS

This application claims benefit of co-pending Provisional U.S. patent application Ser. No. 60/156,224 filed Sep. 27, 1999, entitled "Apparatus and Method for De-Esser Using Adaptive Filtering Algorithms."

BACKGROUND OF THE INVENTION

The present invention relates generally to the removal of a noise or an unwanted signal portion from an input audio signal. More particularly, this invention pertains to the removal of the noise portion of the sound of the spoken letter "s" in the English language for use in amplifiers, musical instruments, and the like.

A typical problem for an audio or acoustic sound system is the high pitched screech associated with signal feedback. For an example, consider a person speaking at a microphone to an audience through an amplification system. The microphone picks up the person's speech and transforms the acoustic waves into an analog audio signal. This analog audio signal is then transmitted to an amplifier and sent to the speaker system. When a high amplitude, high frequency signal is sent through the speakers, this signal is picked up by the microphone and then transmitted through the amplifier and back to the speakers. This circular pattern continues and the resulting sound is the high pitched screech normally associated with feedback. This feedback loop can be initiated by the "ess" sound in spoken languages. This "ess" sound is also known as a sibilant.

The prior art teaches that speech sounds can be organized into three distinct classes, voiced sounds, fricative sounds, and plosive sounds. This classification is based on the mode of excitation. Forming a constriction at some point in the vocal tract, and forcing the air through the constriction at a high enough velocity to produce turbulence creates unvoiced fricatives.

Unvoiced fricatives are generally high frequency in nature. Included in this class of speech sounds are sibilants. Sibilants are commonly known as the "ess" sound. Sibilants are primarily composed of high frequency components with a sharp amplitude rise above 1 kHz. The majority of energy is housed in the 4 kHz to 10 kHz region.

The high frequency high amplitude nature of sibilants can often cause significant problems in audio equipment. Problems occur in all fields of audio engineering including live sound, recording, and broadcast. Specific problems include amplifier clipping and over-modulation in FM sound transmission.

Past methods to solve problems caused by sibilants have include compression and equalization (EQ). These methods are suitable for limited applications, but if these solutions are not selectively used they can cause unnecessary processing of the audio signals.

A example of these past solution to problems brought about by sibilants is to use frequency dependent compression, or what is commonly known as a de-esser. Most de-essers consist of a compressor with a side chained equalizer (EQ), setup so that any sounds in the sibilant frequency range cause the compression to occur. These processors are generally effective, but they also compress other signals, such as cymbals, that occur in the sibilant frequency range detected by the EQ.

In past research, a detection filter has been used to first detect sibilants before any dynamic processing occurs. These prior art algorithms for detection have either been hardware based, or too computationally difficult to perform in real time.

This invention presents a digital adaptive technique for detecting and removing sibilants in real-time processing. This invention provides a digital algorithm for detecting the undesirable sibilants signal, and limiting the modification of the input signal to the undesired signal portion. Thus, the invention teaches how to use both detection and estimation filters to recognize and filter the unwanted signals.

SUMMARY OF THE INVENTION

The present invention teaches a method and apparatus for the real-time creation of a clean-output audio signal from an input signal with an unwanted signal or noise portion. The system detects the unwanted portion of the input signal by utilizing a high resolution adaptive detection filter and reduces the unwanted portion of the input signal. The reduction of the unwanted portion is performed by compression of the unwanted signal, subtraction of the unwanted portion of the signal, or eliminating the output signal until the unwanted portion is no longer detected. The system is specifically designed to find a high frequency and high amplitude sound such as a sibilant.

In one embodiment of the invention, the unwanted signal portion is detected by comparing the input signal to an example of the unwanted portion. This comparison is used to generate a similarity value that is representative of the comparison. If the similarity value exceeds a preset threshold, then the system will output a detection signal. The example may be selected from an unwanted signal database that holds multiple examples that vary according to the different voice parameters or other factors affecting human speech such as age, gender, primary language, and geographic dialect influences.

The comparison is performed using a high resolution detection filter which compares the incoming data stream against a model or example of the unwanted signal portion.

In one embodiment, the system reduces the unwanted signal portion by compressing the limited frequency domain normally associated with the unwanted portion. The signal modification unit performs a frequency compression which selectively covers a frequency domain. The system also allows for a second method for reducing the unwanted portion by filtering the frequency domain of the unwanted portion with an adaptive noise cancellation estimation filter. A third method for reducing the unwanted signal portion is by subtracting a portion estimation from the input signal. These methods may be used for partial or complete removal of the sibilant or unwanted portion from the signal.

In another embodiment, the unwanted signal portion detection apparatus utilizes a computer system for operating a computer program. The program uses an unwanted signal example that is selected from a sibilant database. As an alternative, the unwanted signal example may also be generated using a signal generator by inputting voice characteristics so that the signal generator will create a sibilant example for processing. The unwanted signal example is then used in a signal comparitor where a real time comparison of the unwanted single and the input signal is used to generate a similarity value. The similarity value is representative of the similarity between the unwanted signal portion and the input signal. A threshold detector compares the similarity value against a threshold level, and generates a modification signal when the similarity value exceeds the threshold. The signal modification unit then modifies the input signal when a modification signal is detected.

The sibilant or unwanted signal example may be selected from a database of unwanted signals. The unwanted signal example may be selected based upon known characteristics of the input signal. Thus, the sibilant examples can be representative of the physical characteristics of a multitude of voices. In this manner, the sibilant example may be selected according the voice characteristics of the person creating the input signal.

DESCRIPTION OF THE PREFERRED EMBODIMENTS

This invention discloses a method, system, and apparatus for the real-time creation of an output audio signal from an input signal with an unwanted or noise signal portion. The input audio signal is a digital signal representation of an acoustic sound signal. The audio signal includes unwanted high-amplitude high-frequency portions. A high amplitude, high frequency portion is any signal similar to a sibilant signal that may cause equipment problems, resonant signals, or feedback signals in an acoustic sound device. The system detects the unwanted portion of this input audio signal by utilizing a high resolution adaptive detection filter and reducing the unwanted portion of the input signal. The reduction of the unwanted portion is performed by compression of the unwanted signal, subtraction of the unwanted portion of the signal, or eliminating the output signal until the unwanted portion is no longer detected. The system is specifically designed to find a sibilant or other high frequency and high amplitude sound to reduce the feedback effect in an acoustic sound amplification device.

Signal and Noise

A linear filtering system consisting of stochastic signal and noise processes can be represented by the following equations:

$$E\{r(t)\}=E\{s(t)\}+E\{n(t)\} \quad (1)$$

$$E\{R(j\omega)\}=E\{S(j\omega)\}+E\{N(j\omega)\} \quad (2)$$

Figure 1:
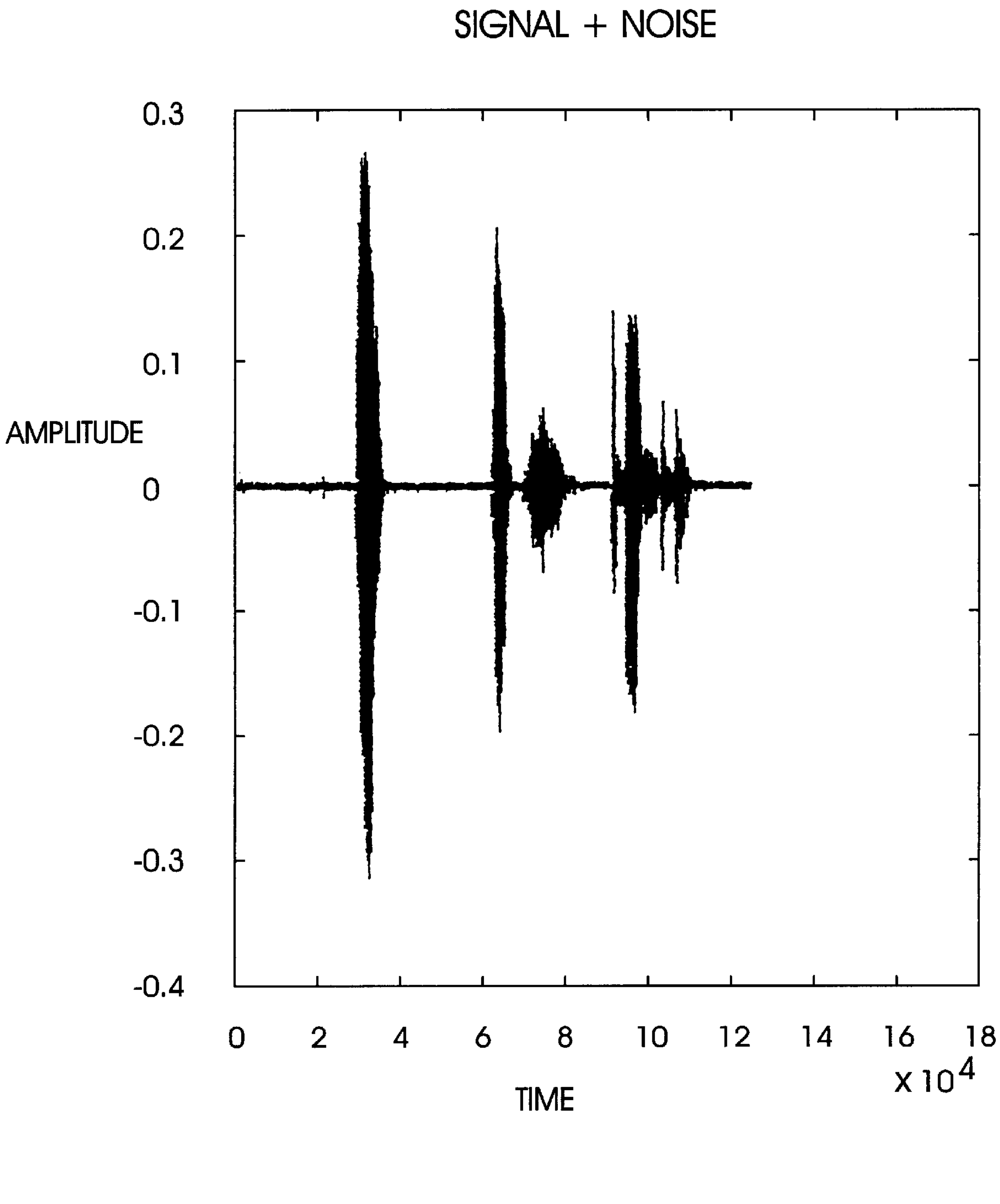
FIG. 1 is a graph of the input signal for the sentence "But it's possible."
Figure 2:
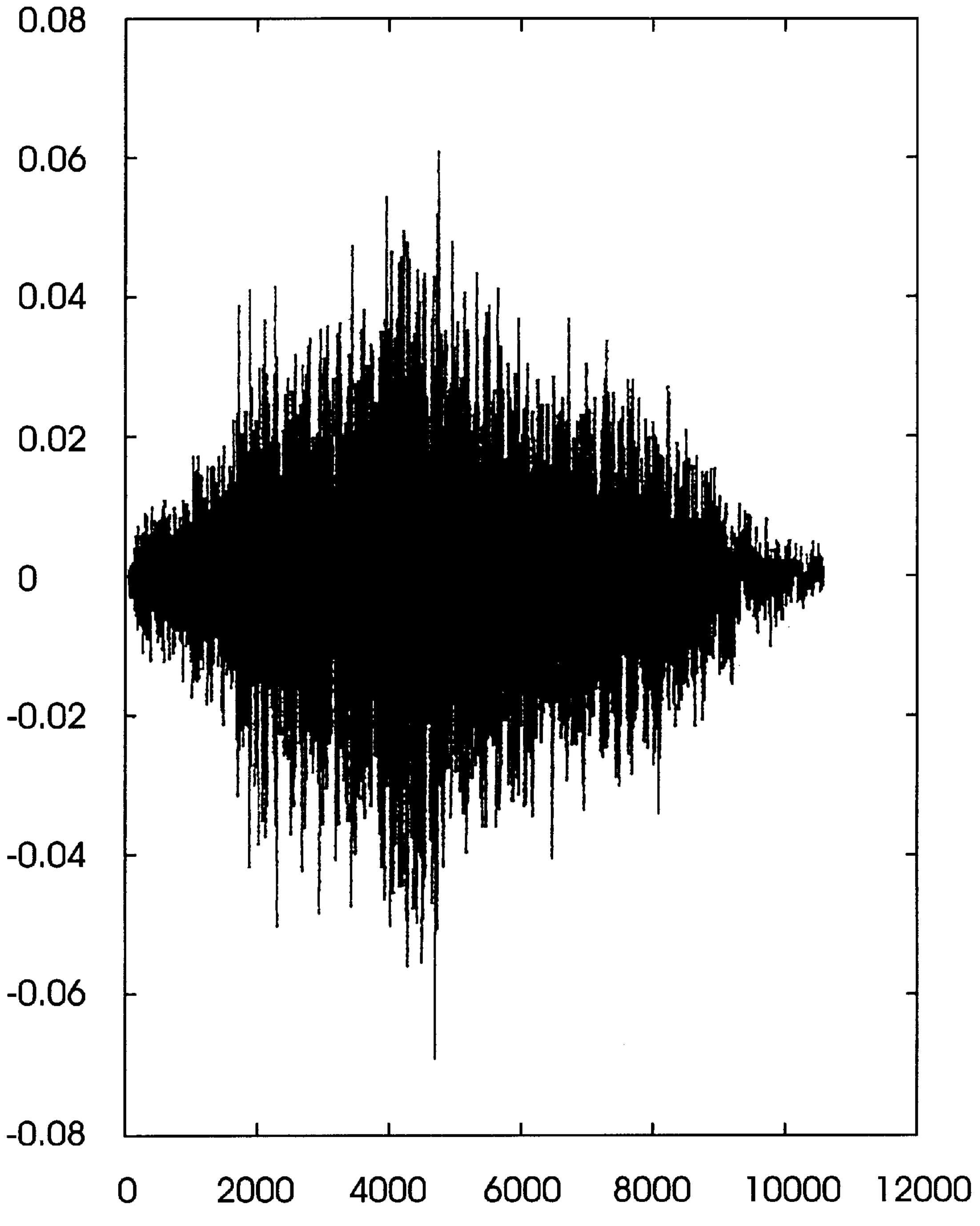
FIG. 2 is a time domain representation of the "s" sound.

For the purposes of the explanation of this invention, the input signal r(t) in equation 1 is the sentence "But it's possible." The graph of the input signal r(t) is shown in FIG. 1. The noise in this input signal consists of the "s" in "it's" and the "ss" in "possible". This noise may also be seen in the time domain representation of the "s" as shown in FIG. 2.

Because sibilance is a natural occurrence in human speech, it is impossible to obtain an input signal that does not have the "s" sound. Thus, it is impossible to obtain a realistic input signal that does not contain the unwanted noise portion of the "ess" sound. For this reason, we use an estimate of the noise signal s(t) as shown in FIG. 2. The present invention utilizes a sibilant example, also known as an unwanted portion example, that was created by smoothing the actual sibilant samples from 200 individuals. Each person spoke a sibilant which was recorded and combined with the sibilant signals from the other individuals. The combination of these sibilants resulted in a consistent signal base for the sibilant noise which is known as a smooth sibilant. As an alternative to utilizing an actual sibilant example, the unwanted signal example may also be generated by using a signal generator and inputting the appropriate characteristics so that the signal generator will create a sibilant example for processing. By utilizing a signal generator for the unwanted portion example, different signals could be generated for different speech and voice characteristics. The generator can be set up so that the generator utilizes different input parameters including items such as a speaker's age, gender, and physical characteristics so that the signal generator can adapt to the different types or styles of sibilants. Another type of signal selector can include a database of multiple sibilant samples from which the individual unwanted sibilant portion may be selected. This allows for the database to store sibilant examples for the different voice characteristics of the potential speaker's voices. The selected unwanted sibilant portion may then be selected in accordance with the speaker's voice or physical characteristics. Now that we have obtained an example of the unwanted signal portion, this unwanted portion must be detected in the input signal.

Detection Filters

A problem of common interest in audio signals is the detection of a signal in noise or of a noise in a signal. There are three common detection filters: matched filters, high-resolution filters, and inverse filters. These are shown mathematically in equation 3—matched filters, equation 4—high-resolution filters, and equation 5—inverse filters.

$$H_{md}=E\{S^*(j\omega)\}/E\{|N(j\omega)|^2\} \quad (3)$$

$$H_{hrd}(j\omega)=\frac{E\{S^*(j\omega)\}}{E\{|S(j\omega)|^2\}+E\{|N(j\omega)|^2\}} \quad (4)$$

$$H_{inv}(j\omega)=1/E\{S(j\omega)\} \quad (5)$$

Equation 3 shows the matched detection filter, which is also known as the classical detection filter. The matched detection filter emits a narrow pulse when the signal or noise is detected. A matched detection filter introduces a phase, which is opposite to the signal phase. Hence, all of the output spectral components of a signal similar to the expected signal will be in phase. This causes a narrow pulse when the signal occurs.

Equation 5 shows the inverse detection filter. The inverse detection filter is the simplest of the detection filters. An impulse is output when only the signal, and no noise, is applied. Unless equation 6 is satisfied, large error will be introduced into this filter.

$$|SNR_i|>>1 \quad (6)$$

In contrast to the matched detection filter and the inverse filter, the high-resolution detection filter shown in equation 4 is the most useful filter. It outputs a narrow pulse when a signal similar to s(t)+n(t) is applied. A high-resolution detection filter is an inverse detection filter combined with an uncorrelated Wiener estimation filter.

Estimation Filters

Estimation filters are another common form of adaptive filter. To optimize a filter, the output error must be minimized. This can be accomplished by analyzing the integral-squared error.

$$ISE=\int(|e(t)|)^2 \tag{7}$$

Where e(t)=d(t)−c(t). In this equation, d(t) is the desired signal and c(t)−h(t)r(t) is the output of the filter. This may be manipulated and converted to the frequency domain equation shown as equation 8.

$$H(j\omega)=\frac{D(j\omega)R^*(j\omega)}{R(j\omega)R^*(j\omega)} \tag{8}$$

If equations 1 and 2 are assumed, then equation 8 results in the correlated Wiener estimation filter.

$$H(j\omega)=\frac{E\{S(j\omega)(S^*(j\omega)+N^*(j\omega))\}}{E\{|S(j\omega)|^2+|N(j\omega)|^2\}} \tag{9}$$

The expectation operand E{ } is used to obtain a statistically optimum filter.

If the signal and noise are uncorrelated and have zero mean in equation 9, then the transfer function reduces to the uncorrelated Wiener estimation filter. This is shown in equation 10.

$$H(j\omega)=\frac{E\{|S(j\omega)|^2\}}{E\{|S(j\omega)|^2+|N(j\omega)|^2\}} \tag{10}$$

If the input has a high SNR than the filter will converge to 1, if it is very low, it will converge to $1/|N(j\omega)|^2$.

Filter Classification

The detection and estimation filters discussed in the previous sections all assume apriori knowledge of the signal and noise. Unfortunately these are rarely available.

Ideal filters can be separated into three classes: Class 1: signal and noise known; Class 2: signal or noise known; Class 3: signal and noise not known. In class 2 and class 3 spectral estimates must be used. Using equations 11 and 12 class 2 estimates can be made.

$$E\{S(j\omega)\}=E\{R(j\omega)-N(j\omega)\} \tag{11}$$

$$E\{N(j\omega)\}=E\{R(j\omega)-S(j\omega)\} \tag{12}$$

Class 3 filters use smoothing or frequency domain averaging to get signal estimates. Equation 13 shows a possible signal estimate.

$$\langle R(j\omega)\rangle=S(j\omega) \tag{13}$$

As stated earlier, we do not know our signal apriori. Hence class 2 algorithms will be used in this processor.

Algorithm

Most store bought de-essers are actually just compressors. In most cases a high frequency equalization boost is inserted in the compressor's gain reduction control circuit, so that frequencies in the sibilant range cause the compression. In an earlier section we discussed the apparent flaws in these systems.

Figure 3:
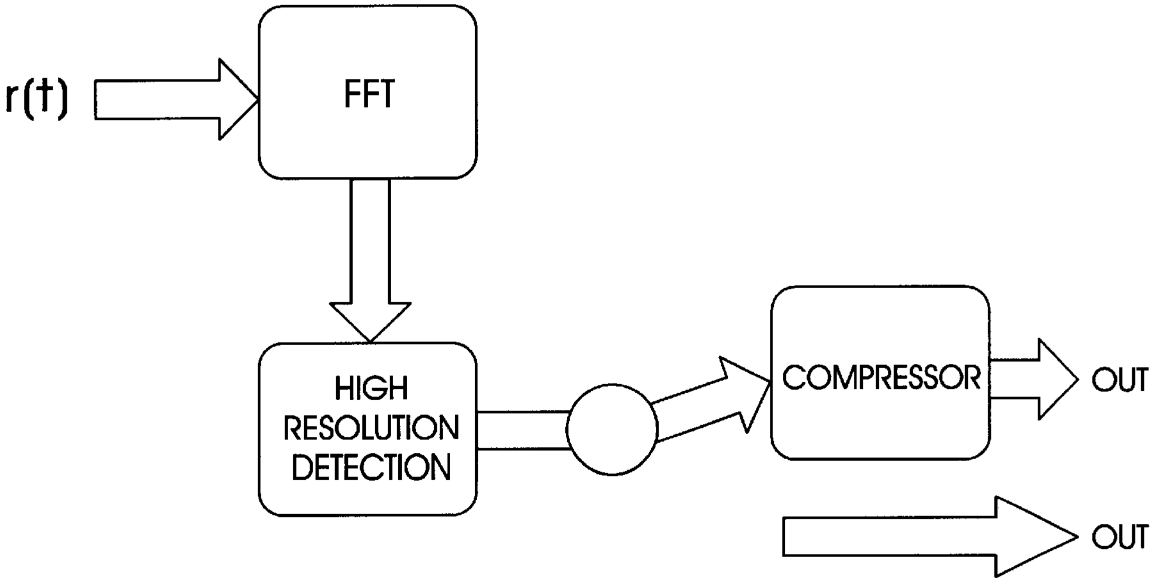
FIG. 3 is a is a block diagram of the compression algorithm.

One way to solve our problems is to use an adaptive detection filter, and only compress the signal when the sibilance occurs. Even better would be to do compression in the frequency domain, so that we can limit our dynamic processing to a frequency band in which sibilants occur. A block diagram is shown in FIG. 3. This algorithm assumes block processing will be performed.

Figure 4:
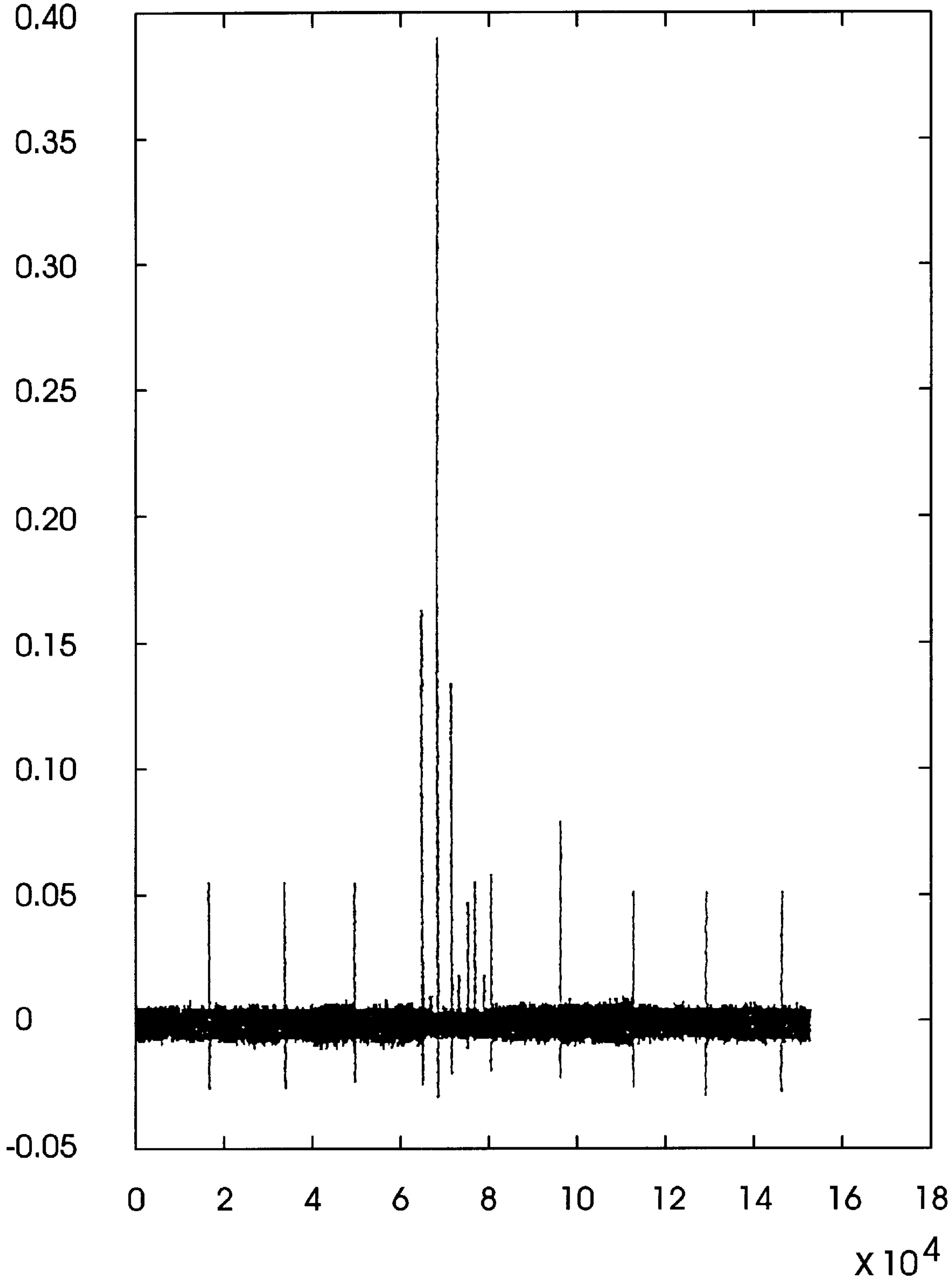
FIG. 4 is a graph of the output of the high resolution detection filter.

Using a high-resolution detection filter produces the output in FIG. 4. It is very evident from FIG. 4 why the present invention utilizes a threshold detector. The constantly occurring low level spikes are background noise included in the input signal. This background noise is not sufficient to cause the feedback or other problems associated with the unwanted signal examples. Thus, the input signal does not have to be modified to reduce the effect of this low level signal associated with the background noise. Also shown in FIG. 4 is the way in which the detection filters will output a pulse with amplitude according to the similarity of the comparison between the signal and the unwanted portion. Thus, the detection signal will have an amplitude that is correlated to how much of the signal is present. In this example, a threshold of 0.07 or −23 dB was used to detect the unwanted signal portion, and ignore the low amplitude signals that do not cause system problems. Although any of the detection filters could be used to create these signals, it was found that the high-resolution detection filter out performed the other filters for this application. Thus, the amplitude of the detection signal output is processed by the threshold detector to control when the input signal should be modified to reduce the effects of the unwanted signal portion.

Figure 5:
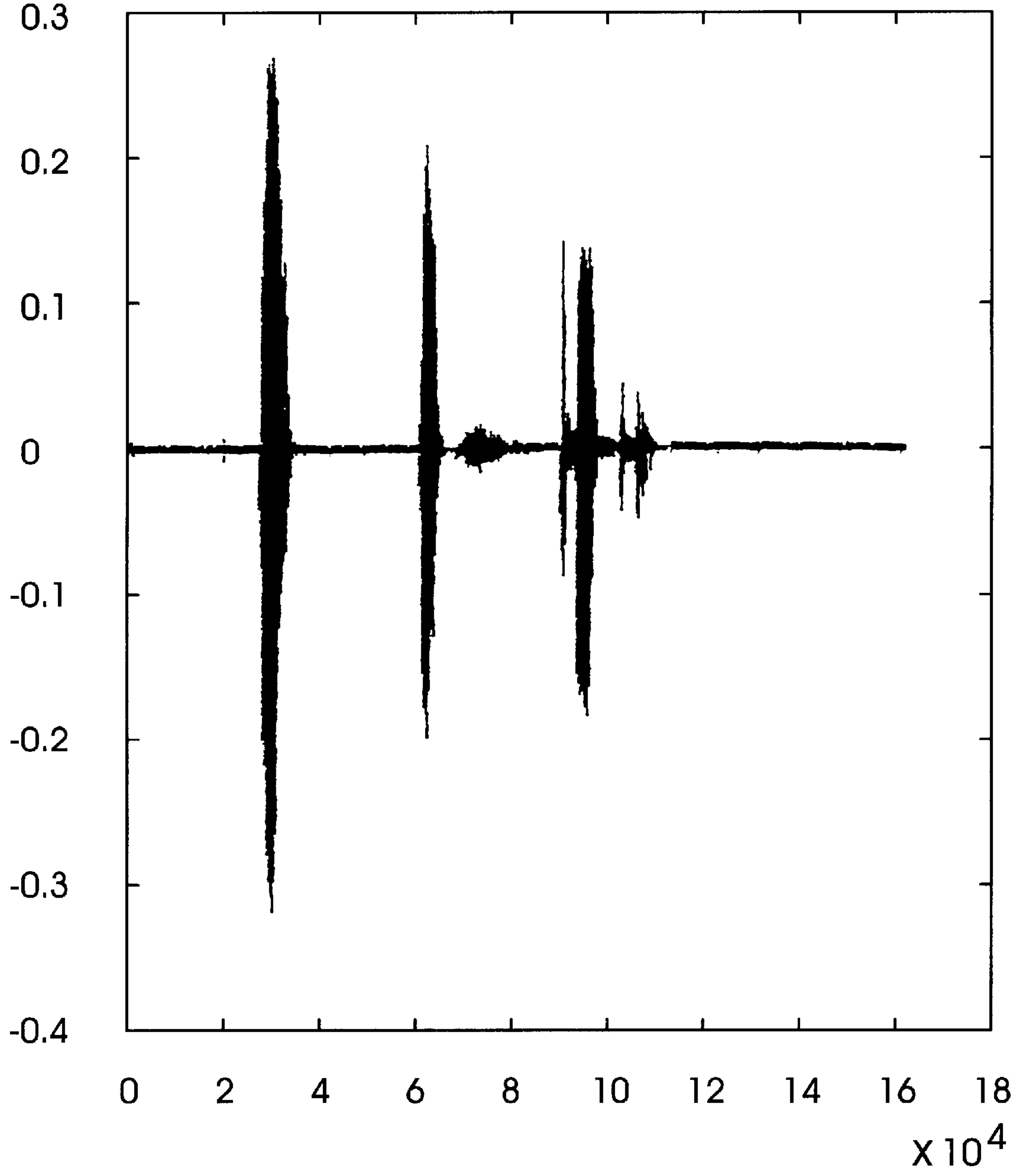
FIG. 5 is a graph of the results of the detection and compression algorithm on the input signal.

FIG. 3 shows the switch that is controlled by the threshold detection. If a sibilant or unwanted signal portion is detected, the frequency domain compression goes into action. For this paper a limiting scheme was used between 4 kHz and 10 kHz to simplify the computation. The effects of this compression are shown in FIG. 5. Note how the "s" signals have been reduced when compared against the input signal shown in FIG. 1. It is also envisioned that a more elaborate compression algorithm could improve the results even more.

Figure 6:
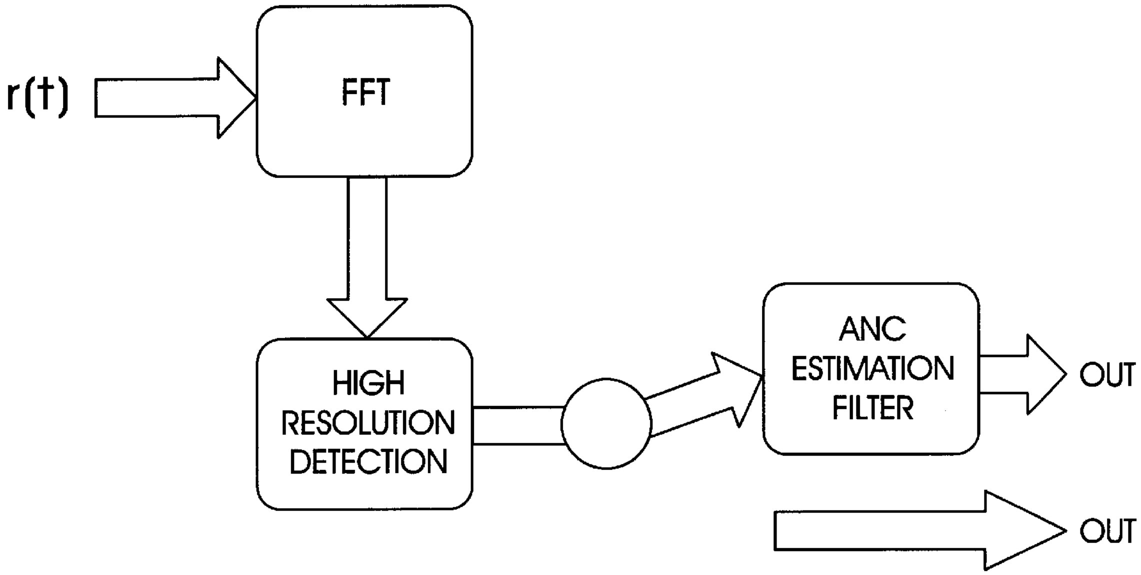
FIG. 6 is a block diagram of the detection and estimation algorithm.
Figure 7:
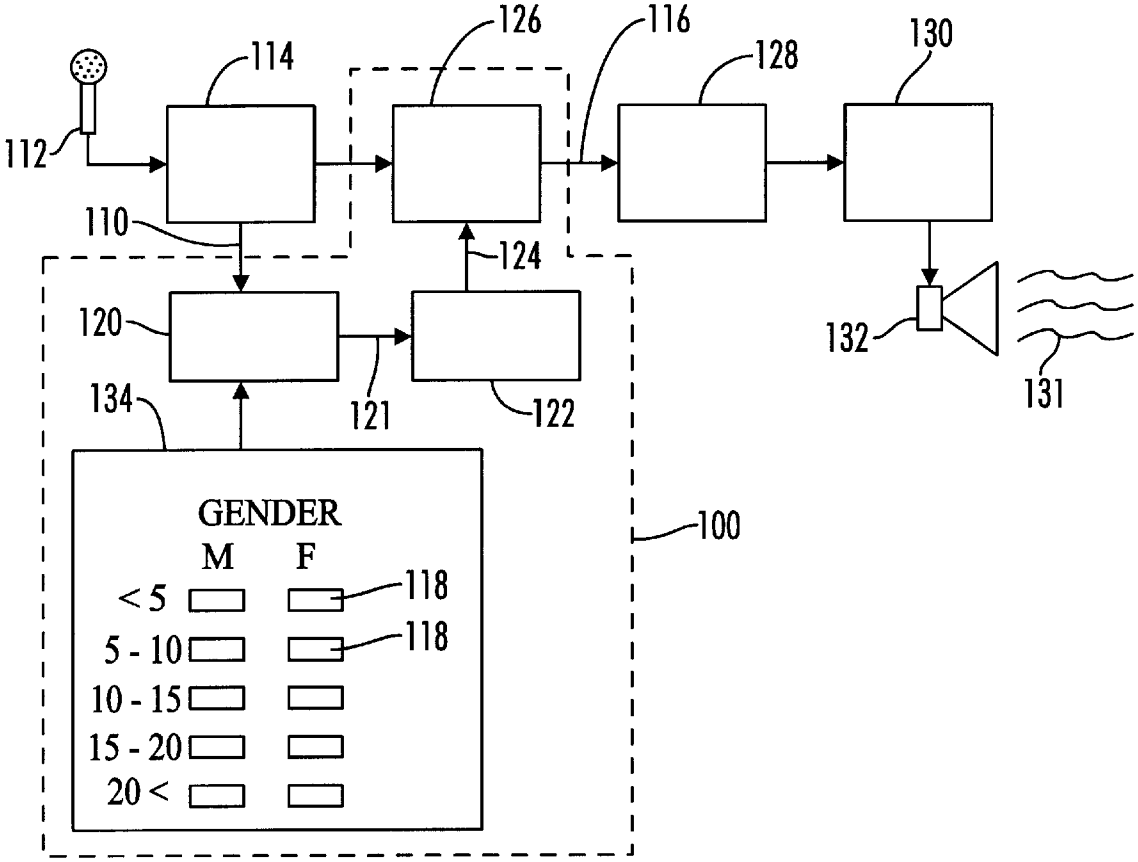
FIG. 7 is a block diagram of a signal processing apparatus used to reduce the effects of an unwanted signal portion.

An alternative method to the signal compression previously described could be used to estimate the sibilant entire out of the input signal. This isn't entirely desirable in a practical example because an ideal filter would entirely remove the sibilant sound, which is not truly what we need. However, for illustrative purposes, an algorithm for performing this function is shown in FIG. 6.

Instead of utilizing a compression algorithm, this method utilizes an active noise control (ANC) estimation filter to estimate the unwanted signal portion. This estimation is then subtracted from the input signal to eliminate or greatly reduce the effects of the unwanted signal portion.

In this example a correlated wiener ANC filter is used. This is shown in eqatuation 14. An ANC estimation filter is essentially equal to 1-Hest.

$$H\{j\omega\}=\frac{E\{N(j\omega)(S^*(j\omega)+N^*(j\omega))\}}{E\{|S(j\omega)|^2+|N(j\omega)|^2\}} \tag{14}$$

The output of this system did not completly remove the noise, but lowered its amplitude a fair amount. This is most likely due to the scaling factor k used in the signal estimate as shown in equation 15.

$$E\{S(j\omega)\}=E\{R(j\omega)-kN(j\omega)\} \quad (15)$$

This factor is hard to estimate. To compensate, class 3 denominators can be used.

Performance Measures

The nature of the signal used does not allow us to have apriori knowledge of the signal. For this reason, normal performance measures can not really be applied. To solve this problem, a noise to noise ratio was created. A selection of the signal r(t) containing a sibilance was compared to the known noise n(t). This was done for the original signal, and the two algorithms defined herein. The formula is displayed in equation 16.

$$NNR=\sqrt{((\Sigma|N_1(m)|^2)/(\Sigma|N_2(m)|^2)} \quad (16)$$

Where Σ is from m=1 to N. The results are shown below.

| Signal | NNR |
|---|---|
| R | 1.5197 |
| Out1 | 0.0044 |
| Out2 | 0.0626 |

It is evident that the NNR goes down which is desired. This is telling us that the noise energy compared to the original goes down. If a general estimate of sibilant noise were to be used, this algorithm would most likely perform even better. The most effective technique was found using the compression algorithm which is attributed to the extreme limiting scheme being used.

Embodiments

FIG. 6 of the drawings shows a schematic view of a signal detection and processing apparatus 100 that is used for detecting unwanted signals in an digital input audio signal 110. This embodiment of the invention accepts a digital input signal 110 such as that generated by a microphone 112 and an analog to digital converter 114. This input signal 110 is then processed to remove or decrease the effect of an unwanted signal portion to create an output audio signal 116. The unwanted signal portion is detected by comparing the input signal 110 to an example 118 of the unwanted portion with a detection filter 120. This comparison is used to generate a similarity value that is representative of the comparison. If the threshold detector 122 finds that the similarity value exceeds a preset threshold, then the threshold detector 122 will output a modification signal 124. This modification signal 124 activates an unwanted portion reducer 126 which reduces the effect of the unwanted portion of the input signal to create the output signal 116. This unwanted portion reducer is also known as a signal modification unit 126. This output signal 116 is then converted back into an analog signal by the digital to analog converter 128 and amplified by the amplifier 130 to power the speaker 132. In this manner, sound waves are produced which have a reduced unwanted signal portion for reducing the effect of feedback in the overall process.

As shown in FIG. 6, the unwanted signal portion 118, which is also known as a sibilant example 118, may be selected from an unwanted signal database 134 that holds multiple examples 118. The examples 118 vary according to the different voice parameters or other factors affecting human speech such as age, gender, primary language, and geographic or dialect influences.

The detection filter comparison performed by the detection filter 120 is performed using a high resolution detection filter which compares the incoming data signal 110 stream against the model or example 118 of the unwanted signal portion.

The unwanted portion reducer 126 reduces the unwanted signal portion by compressing the limited frequency domain normally associated with the unwanted portion. Thus, the reducer 126 performs a frequency compression which may selectively cover a frequency domain. An effective frequency domain for reducing the effects of sibilants can be selected to contain the frequencies between 4 kHz and 10 khz. Thus, the signal modification unit 126 performs a frequency compression which selectively covers a frequency domain.

An alternative to compression is provided for implementation in the signal modification unit 126 by utilizing a second method for reducing the unwanted portion. This second method reduces the unwanted portion by filtering the frequency domain of the unwanted portion from the input signal 110. A third method could be utilized by switching off the output signal until the unwanted signal portion is no longer detected. However, this method is deemed to be extreme for the voice processing example described herein. These methods may be used for partial or complete removal of the sibilant or unwanted portion from the signal 110.

In another embodiment, the signal apparatus 100 utilizes a computer system for operating a computer program. The program uses an unwanted signal example 118 that is selected from a sibilant database. The unwanted signal example is then used in a detection filter 120 which is also known as a signal comparitor 120 where a real time comparison of the unwanted signal example 118 and the input signal 110 is used to generate a similarity value 121. The similarity value 121 is representative of the similarity between the unwanted signal portion 118 and the input signal 110. A threshold detector 122 compares the similarity value against a threshold level, and generates a modification signal 124 when the similarity value 121 exceeds the threshold. The signal modification unit 126 then modifies the input signal 110 when a modification signal 124 is detected.

The sibilant or unwanted signal example 118 may be selected from a database 134 of unwanted signals. The unwanted signal example 118 may be selected based upon known characteristics of the input signal 110. Thus, the sibilant examples 118 can be representative of the physical characteristics of a multitude of voices. In this manner, the sibilant example 118 may be selected according the voice characteristics of the person creating the input signal 110.

The following computer program, written in the MatLab language, illustrates the programmed algorithm for performing the sibilant detection and filtering. This program also includes a compression algorithm which has been included for illustrative purposes, but remarked out of the operation of the program by the "%" symbol beginning the line, because the filtering algorithm is being utilized.

```
%—Variable Definitions
SplusN=wavread ('Sentence.wav');
Noise=wavread ('Sibilance.wav');
SigNoise—SplusN;
S=size (SplusN);
```

```
N=size (Noise);
NFFT=16384;
start=1;
finish=nFFT;
length=S(1)/nFFT;
NumZeroes=nFFT−N(1);
ZeroAppend=zeros(NumZeros, 1);
NoiseF=fft ([Noise 'ZeroAppend']');
NoiseF_2=(abs(NoiseF))^2;
NoiseFconj=conj(NoiseF);
semilogz(zHz, 20* log(abs(NoiseF)));
title('Frequency Plot of/s/ Sibilant');
xlabel('Hertz');ylabel('db');
figure;
TotalOuput=[ ];
For I=1:length
  %—Filter Sub Elements
  SplusNF=fft(SplusN(start:finish));
  %—High Resolution Detectoin Filter
  Hhrd=NoiseFconj./(NoiseF_2+(abs(SplusNF−
    NoiseF)).^2);
  OuputF=Hhrd.*SplusNF;
  OutputT=real(ifft(OutputF));
  if I==1
    TotalOutput−OutputT;
  else
    TotalOutput=[TotalOutput'OutputT'];
  end
  %—Threshold detector
  if max(OutputI)>(0.07)
    %—Estimation Algorithm Filter
    Hest=NoiseF_2./((abs(SplusNF−0.00025* NoiseF).
      ^2+NoiseF_2);
    SignalF=Hest.*SplusNF;
    SignalT=real(ifft(SignalF));
    SigNoise(start:finish)=SigNoise(start:finish)−
      SignalT;
    %—Compressor
    % SplusNF(1000:nFFT)=SplusNF(1000:nFFt)
      *0.25;
    % SignalT=real(ifft(SplusNF));
    SinNoise(start:finish)=SignalT;
  end
    start=start+nFFT;
    finish=finish+nFFT;
    end
    plot(TotalOutput)
    figure;
    plot(SplusN);;xlabel('Time');ylabel('Amplitude');
      title('Signal'+Noise');
    figure;
    plot(sigNoise);xlabel('Time')'ylabel('Amplitude');
    figure;
    plot(Noise);xlabel('Time');ylabel('Amplitude');title
      ('Sibilant /s/');
```

The program begins by initializing the variables and setting up a loop to run through the signal. The system has been programmed to run through a signal of a known length, however, it is also envisioned that this could be easily modified to run a constant input stream of unknown length.

The high resolution detection filter is then run on the input signal to find matches with the smooth sibilant. A similarity value is then assigned to the relative level of match between the input signal and the match. This similarity value is then monitored to see if it exceeds a threshold value and a detection signal is generated in response to the similarity value exceeding the threshold. If this similarity exceeds the threshold value, then the system will filter out the unwanted signal portion. An optional compression filter is also shown. The system will then reset to process the next section of signal.

As shown herein, there is an immense power in utilizing adaptive filters for signal processing. With very little apriori information, we have been able to filter a signal in such a way to detect noise and filter it out. The algorithms discussed here could be used to create a supreme improvement to existing technology. By utilizing detection filters, the amount of dynamic processing can be reduced to only take effect when a sibilant signal is present in the input signal. Thus, it is apparent that adaptive filters are very useful and their use in audio technology is limitless.

Thus, although there have been described particular embodiments of the present invention of a new and useful Apparatus and Method for De-esser using Adaptive Filtering Algorithms, it is not intended that such references be construed as limitations upon the scope of this invention except as set forth in the following claims.

What is claimed is:

1. A method for the real-time creation of an output acoustic signal from an input signal with a unwanted portion, comprising:

providing a database with a plurality of portion examples;

selecting a portion example from said plurality for use as said unwanted signal portion example;

comparing said input signal and said unwanted signal portion example;

generating a similarity value representative of the similarity between said unwanted signal portion example and said input signal;

comparing said similarity value to a threshold value and generating a modification signal; and reducing said unwanted portion of said input signal upon generation of said modification signal to form said output signal.

2. The method of claim 1, wherein said unwanted portion is characterized by high frequency and high amplitude.

3. The method of claim 1, wherein said unwanted portion is a sibilant.

4. The method of claim 1, wherein said plurality of portion examples includes a plurality of sibilants for different voice parameters.

5. The method of claim 1, wherein said comparing utilizes a fast fourier transform and high resolution detection filter.

6. The method of claim 1, wherein said reducing includes compressing the input signal.

7. The method of claim 6, wherein said compressing is limited to the frequency domain of said unwanted portion.

8. The method of claim 1, wherein said reducing includes filtering the frequency domain of said unwanted portion.

9. The method of claim 1, wherein said reducing includes subtracting a portion estimation from said input signal.

10. An apparatus for detecting unwanted signal portions in an input signal, comprising:

an unwanted signal portion database including an unwanted signal portion example;

a signal comparitor for comparing said input signal and said unwanted signal portion example and generating a similarity value representative of the similarity between said unwanted signal portion and said input signal; and a threshold detector for comparing said similarity value to a threshold value and generating a modification signal;

a signal modification unit for modifying said signal upon generation of said modification signal.

11. The apparatus of claim 10, wherein said unwanted signal portion database includes a plurality of unwanted signal portion examples.

12. The apparatus of claim 10, wherein said unwanted signal portion example is selected from said plurality based upon a characteristic of said input signal.

13. The apparatus of claim 10, wherein said plurality of unwanted signal portion examples is representative of the physical characteristics of voices.

14. The apparatus of claim 10, wherein said comparitor is a filter.

15. The apparatus of claim 10, said filter is a high resolution detection filter.

16. The apparatus of claim 10, wherein said signal comparitor utilizes a high resolution detection filter characterized by the equation $$H_{hrd}(j\omega) = \frac{E\{S^*(j\omega)\}}{E\{|S(j\omega)|^2\} + E\{|N(j\omega)|^2\}}$$

to compare the input signal and the unwanted signal portion.

17. The apparatus of claim 10, wherein said threshold value is approximately 23 dB.

18. The apparatus of claim 10, wherein said signal modification unit includes a switch.

19. The apparatus of claim 10, wherein said signal modification unit performs a frequency compression.

20. The apparatus of claim 10, wherein said frequency compression selectively covers a frequency domain.

21. The apparatus of claim 10, wherein said frequency domain is between 4 kHz to 10 Khz.

22. The apparatus of claim 10, wherein said filter is an adaptive noise cancellation estimation filter.

23. The apparatus of claim 10, wherein said signal modification unit subtracts an unwanted signal portion estimate from said signal.

24. The apparatus of claim 10, wherein said unwanted signal portion is entirely removed from said signal.

* * * * *